(12) United States Patent
Valtanen (10) Patent No.: US 10,414,318 B2
(45) Date of Patent: Sep. 17, 2019

(54) ARRANGEMENT FOR OPTIMIZING LOAD POSITION IN RELATION TO TRANSPORTATION VEHICLE

(71) Applicant: Rakkatec Oy, Helsinki (FI)

(72) Inventor: Jarkko Valtanen, Helsinki (FI)

(73) Assignee: RAKKATEC OY, Helsinki (FI)

( * ) Notice: Subject to any disclaimer, the term of this patent is extended or adjusted under 35 U.S.C. 154(b) by 0 days.

(21) Appl. No.: 15/140,933

(22) Filed: Apr. 28, 2016

(65) Prior Publication Data

US 2017/0313230 A1 Nov. 2, 2017

(51) Int. Cl.
| | | |
|---|---|---|
| *B60P 1/04* | (2006.01) |
| *B60P 1/30* | (2006.01) |
| *B60P 1/28* | (2006.01) |
| *B60P 1/24* | (2006.01) |
| *B60P 1/34* | (2006.01) |
| *B60P 1/48* | (2006.01) |
| *B60P 1/44* | (2006.01) |
| *B60P 1/32* | (2006.01) |
| *B60P 1/64* | (2006.01) |
| *B60P 1/00* | (2006.01) |

(Continued)

(52) U.S. Cl.
CPC .............. *B60P 1/045* (2013.01); *B60P 1/04* (2013.01); *B60P 1/24* (2013.01); *B60P 1/28* (2013.01); *B60P 1/30* (2013.01); *B60P 1/32* (2013.01); *B60P 1/34* (2013.01); *B60P 1/4471* (2013.01); *B60P 1/483* (2013.01); *B60P 1/486* (2013.01); *B60P 1/6427* (2013.01); *B60P 1/6436* (2013.01); *B60P 1/6454* (2013.01); *B60P 1/00* (2013.01); *B62D 33/00* (2013.01); *B62D 37/04* (2013.01)

(58) Field of Classification Search
CPC .... B60P 1/04; B60P 1/045; B60P 1/24; B60P 1/28; B60P 1/30; B60P 1/32; B60P 1/34; B60P 1/4471; B60P 1/483; B60P 1/486; B60P 1/6427; B60P 1/6436; B60P 1/6454
See application file for complete search history.

(56) References Cited

U.S. PATENT DOCUMENTS

| 4,691,792 A | * | 9/1987 | Shintani | ................. | G01G 5/045 |
| | | | | | 701/124 |
| 5,026,228 A | * | 6/1991 | Mansfield | ............. | B60P 1/6427 |
| | | | | | 410/52 |

(Continued)

*Primary Examiner* — Dale W Hilgendorf
(74) *Attorney, Agent, or Firm* — Ziegler IP Law Group, LLC (57) ABSTRACT

A method and an arrangement for optimizing load position in relation to a transportation vehicle, comprising a platform arranged to the transportation vehicle for receiving a load; an actuating device for moving the platform in relation to the transportation vehicle; a sensing device configured to generate a vehicle sensing signal and/or a non-vehicle sensing signal; a controlling device configured to receive at least one of the vehicle sensing signal and the non-vehicle sensing signal; generate controlling commands based on the received at least one of the vehicle sensing signal and the non-vehicle sensing signal; and transmit the controlling commands to the actuating device; wherein the actuating device is configured to receive the controlling commands and to move the platform in relation to the transportation vehicle based on the controlling commands.

20 Claims, 7 Drawing Sheets

(51) Int. Cl.
*B62D 33/00* (2006.01)
*B62D 37/04* (2006.01)

(56) References Cited

U.S. PATENT DOCUMENTS

| | | | | |
|---|---|---|---|---|
| 5,769,502 A * | 6/1998 | Bettini | ............... | B60P 1/04 280/6.154 |
| 6,069,324 A * | 5/2000 | Shimizu et al. | ............ | B60P 1/045 177/136 |
| 6,152,252 A * | 11/2000 | Pettersson | ............... | B60P 1/045 280/124.106 |
| 6,641,161 B1 * | 11/2003 | McLelland | ............... | B60P 1/04 280/441.1 |
| 6,768,936 B2 * | 7/2004 | Fiorletta | ............... | B60P 1/045 701/36 |
| 7,878,276 B2 * | 2/2011 | Limbacher, Jr. | ........ | B62D 57/02 180/8.5 |
| 2002/0145262 A1 * | 10/2002 | Oldiges | ............... | B60P 1/045 280/6.154 |
| 2004/0051260 A1 * | 3/2004 | Oldiges | ............... | B60P 1/045 280/5.507 |

* cited by examiner

Fig. 15

ARRANGEMENT FOR OPTIMIZING LOAD POSITION IN RELATION TO TRANSPORTATION VEHICLE

TECHNICAL FIELD

The invention relates to an arrangement for optimizing load position in relation to a transportation vehicle. Especially the invention relates to the balancing system for off-road, off-shore or unstable transportation vehicles.

BACKGROUND

This section illustrates useful background information without admission of any technique described herein being representative of the state of the art.

Transportation vehicles are typically equipped with shock absorbers, which might be active or controllable so that the vehicle can be tilted or banked for example when driving in a sloping surface and thereby balancing the vehicle. Also controllable supporting devices are known for keeping a vehicle in a certain level. There are however some disadvantages relating to the known prior art, such as they are quite limited in their operational ranges for balancing the vehicles and especially any stability of the vehicle with loads to be transported are very limited.

The present invention aims to mitigate the problems of the previous solutions by providing an arrangement that can be used to build a cost effective high performance load optimization arrangement.

SUMMARY

Various aspects of examples of the invention are set out in the claims.

According to a first example aspect of the present invention, there is provided an arrangement for optimizing load position in relation to a transportation vehicle, comprising:
  a platform arranged to the transportation vehicle for receiving a load;
  an actuating device for moving the platform in relation to the transportation vehicle;
  a sensing device configured to generate a vehicle sensing signal and/or a non-vehicle sensing signal;
  a controlling device configured to:
    receive at least one of the vehicle sensing signal and the non-vehicle sensing signal;
    generate controlling commands based on the received at least one of the vehicle sensing signal and the non-vehicle sensing signal; and
    transmit the controlling commands to the actuating device;
  wherein the actuating device is configured to receive the controlling commands and to move the platform in relation to the transportation vehicle based on the controlling commands.

In an embodiment, the vehicle sensing signal comprises at least one of the following:
  rotating speed information of at least one wheel of the transportation vehicle;
  angular information of at least one arm for mounting a wheel of the transportation vehicle;
  tyre pressure information of at least one wheel of the transportation vehicle;
  inclination information of at least one wheel of the transportation vehicle or the transportation vehicle; and
  location of a center of gravity of the transportation vehicle and the platform.

In an embodiment, the vehicle sensing signal comprises sensing location of a center of gravity of the transportation vehicle and the platform.

In an embodiment, the controlling commands are configured to control moving the platform in relation to the vehicle so that the center of gravity is kept within a certain area or to balance or manage weight distribution between different portions of the vehicle.

In an embodiment, the controlling commands are configured to control moving the platform towards a rear portion of the vehicle in response to detecting deceleration of the vehicle based on the vehicle sensing signal.

In an embodiment, the controlling commands are configured to control moving the platform towards a front portion of the vehicle in response to detecting acceleration of the vehicle based on the vehicle sensing signal.

In an embodiment, the sensing device comprising pressure or weight sensing device for determining pressure or weight difference or distribution between at least on two points of the arrangement or the vehicle, whereupon the sensing device is configured to determine location of the center of gravity of the arrangement or the vehicle based on the pressure or weight difference, or the distribution.

In an embodiment, the sensing device for generating the vehicle sensing signal comprising at least one of the following:
  an accelerometer;
  an inclinometer;
  an angular velocity sensor; and
  a global navigation satellite system (GNSS) device.

In an embodiment, the sensing device for generating the non-vehicle sensing signal comprising at least one of the following:
  a geomagnetic field sensor;
  a transceiver for receiving weather information and/or topography information;
  a camera;
  an IR-scanner;
  an ultrasound scanner;
  a user input device to receive and generate control information generated in response to driver input;
  a light detection and ranging (Lidar) device; and
  a radar.

In an embodiment, the non-vehicle sensing signal comprises at least one of the following:
  terrain information relating to current position of the vehicle;
  terrain information relating to a path in a heading of the vehicle;
  terrain information around the vehicle;
  control information generated in response to driver input;
  weather information; and
  topographic information.

In an embodiment, the terrain information comprising geometry of the path in the heading of the vehicle.

In an embodiment, the actuating device is configured to initiate the moving of the platform based on geometry changes on the path.

In an embodiment, the actuating device is configured to move the platform in a XY-plane, Z-direction being essentially perpendicular to the XY-plane.

In an embodiment, the actuating device is configured to tilt or bank the platform in relation to at least one of the X, Y and Z axes.

In an embodiment, the actuating device is configured to rotate the platform around a point locating in the XY-plane.

In an embodiment, the actuating device comprising at least one of the following: a hydraulically or pneumatically operated cylinder, an electric motor, a magnetic motor, a threaded rod, a push bar, and a chain.

In an embodiment, a first end of the actuating device is configured to be operationally coupled with the platform and another end is configured to be operationally coupled with the vehicle, either directly or via an accessory device, and further wherein length, angle or position of the actuating device is configured to be adjusted based on the controlling commands.

According to a second example aspect of the present invention, there is provided a transportation vehicle, comprising an arrangement of the first aspect.

In an embodiment, the transportation vehicle further comprises at least one moving device for moving the vehicle, each of the moving devices being coupled with the vehicle via a mounting, where the mounting is configured to adjust height or distance of the moving devices in relation to the vehicle.

According to a third example aspect of the present invention, there is provided a method for optimizing load position in relation to a transportation vehicle, wherein the transportation vehicle comprises a platform for receiving a load, and an actuating device for moving the platform in relation to the transportation vehicle, the method comprising:

generating a vehicle sensing signal and/or a non-vehicle sensing signal by a sensing device;

generating controlling commands based on at least one of the vehicle sensing signal and the non-vehicle sensing signal by a controlling device; and moving the platform in relation to the transportation vehicle based on the controlling commands by the actuating device.

In an embodiment the method further comprising:

receiving external control information by a controlling device; and generating controlling commands based on the external control information, and the at least one of the vehicle sensing signal and the non-vehicle sensing signal by a controlling device.

In an embodiment, the external control information is received from at least one of the following:

another transportation vehicle;
a user device; and
a cloud server.

According to a fourth example aspect of the present invention, there is provided a computer program embodied on a computer readable non-transitory medium comprising computer executable program code, which code, when executed by at least one processor of an apparatus, causes the apparatus to:

generate a vehicle sensing signal and/or a non-vehicle sensing signal by a sensing device;

generate controlling commands based on at least one of the vehicle sensing signal and the non-vehicle sensing signal by a controlling device; and move the platform in relation to the transportation vehicle based on the controlling commands by the actuating device, for optimizing load position in relation to a transportation vehicle, wherein the transportation vehicle comprises a platform for receiving a load, and the actuating device for moving the platform in relation to the transportation vehicle.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

The present invention and its potential advantages are understood by referring to FIGS. 1A through 15 of the drawings. In this document, like reference signs denote like parts or steps.

FIGS. 1A-1C and 2A-2C illustrate principles of exemplary optimizing arrangements 100 and transportation vehicle 200 with said arrangement according to an embodiment of the invention. The optimizing and/or balancing system 100 for the transportation vehicle 200 can be coupled with the transportation vehicle in many ways, such as it can be fixed directly to the body 201 of the transportation vehicle 200, as is described in FIG. 1A, or it can be a portion of or fixed with a platform 202 of the vehicle, as is described in FIG. 1B. The platform can be any system which is able for receiving a load, such as a freight container, tank, receptacle, trough, chassis or any other device or base suitable for receiving a load, or even portion of said load, such as a base of a tool, the tool being as said load, for example. In addition according to an embodiment the optimizing systems 100 may also be a separate, independent system, as is described in FIG. 1C, whereupon it can be arranged between the transportation vehicle and the platform or it can be used as linking and connecting the transportation vehicle and the platform with each other.

Figure 1A:
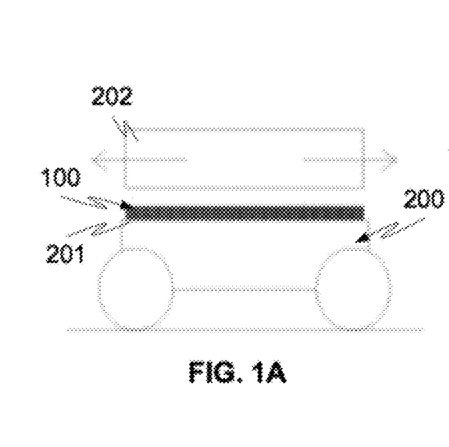
FIGS. 1A-1C illustrate principles of exemplary arrangement and a transportation vehicle with said arrangement according to an embodiment of the invention.
Figure 1B:
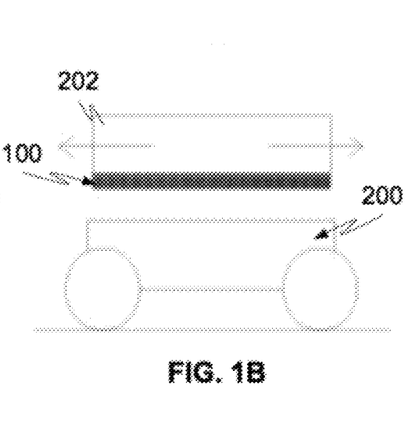
Figure 1C:
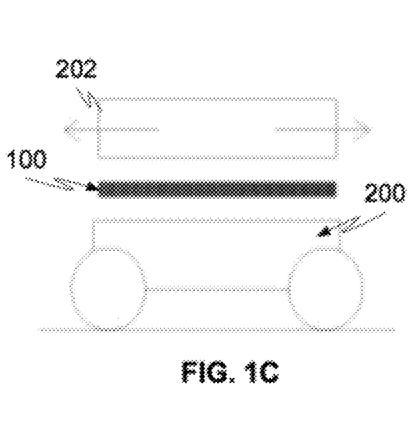
Figure 2A:
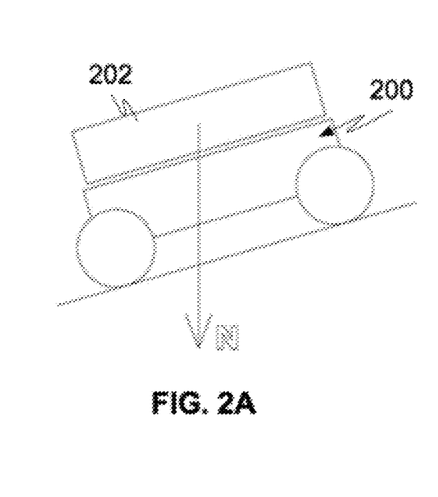
FIGS. 2-4 illustrate exemplary principles for optimizing and/or balancing the transportation vehicle according to an embodiment of the invention.
Figure 2B:
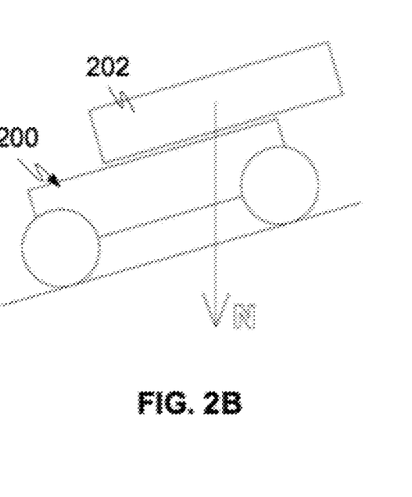
Figure 2C:
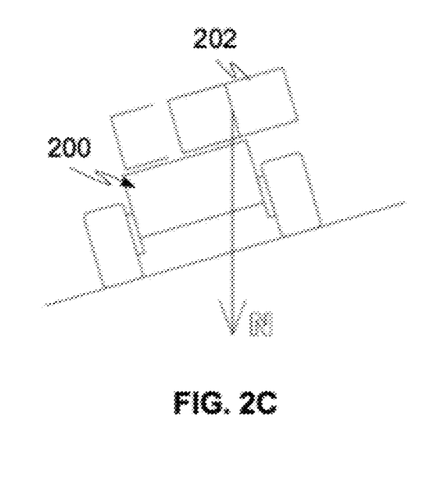

The arrangement 100 is configured for optimizing load position in relation to a transportation vehicle 200, the arrangement 100 comprising a platform 202 arranged to the transportation vehicle 200 for receiving a load; and an actuating device for moving the platform 202 in relation to the transportation vehicle 200, wherein the actuating device is configured to receive controlling commands and to move the platform 202 in relation to the transportation vehicle 200 based on the controlling commands.

The arrangement 100 is advantageously configured for moving the platform 202 in relation to the vehicle and thereby optimizing the system, platform and transportation vehicle 200 in order to manage or keep a centre of gravity in a certain area of a frame of the vehicle 200, for example, to optimize the load position in relation to the vehicle 200 in light of the vehicle 200 off-road movement, for example, as can be seen in FIGS. 2A-2C and FIG. 4.

Figure 3:
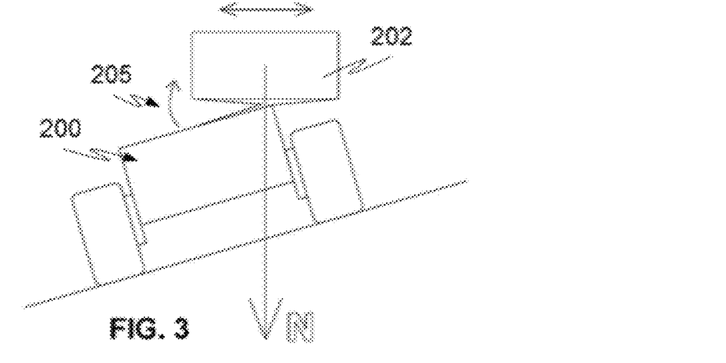
Figure 4:
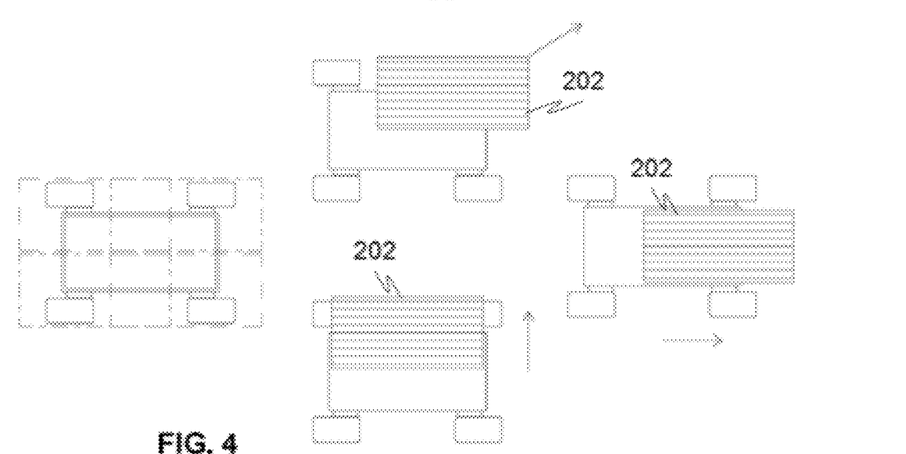
Figure 5A:
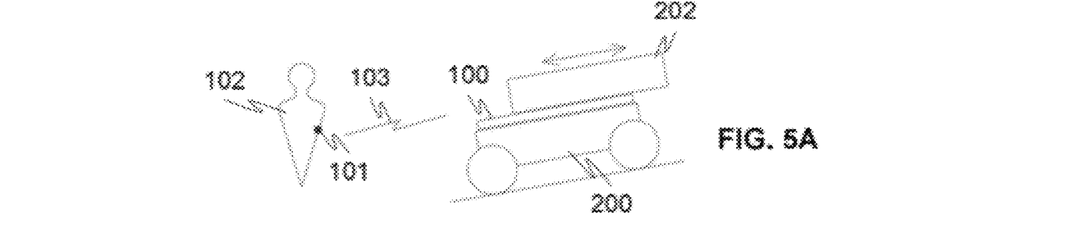
FIGS. 5A-5D illustrate exemplary optimizing arrangements with a controlling arrangement for controlling the load and transportation vehicle with said optimizing arrangement according to an embodiment of the invention.
Figure 5B:
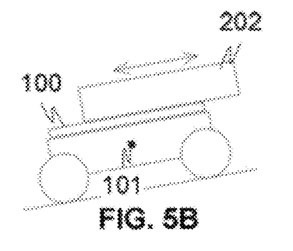
Figure 5C:
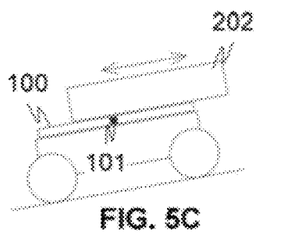
Figure 5D:
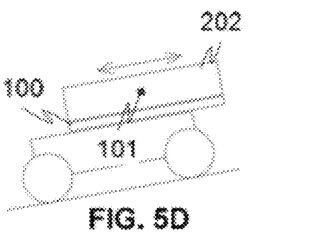

FIGS. 2-4 illustrate exemplary principles for optimizing and/or balancing the transportation vehicle according to an embodiment of the invention.

FIGS. 5A-5D illustrate exemplary optimizing arrangements with a controlling arrangement for controlling the load and transportation vehicle with said optimizing arrangement according to an embodiment of the invention.

In an embodiment, a controlling device 101, 1221 may generate controlling commands for the actuation device 204, wherein the actuating device 204 is configured to receive the controlling commands and to move the platform 202 in relation to the transportation vehicle 200,1220 based on the controlling commands.

The optimization may relate to movement of the vehicle 200, 1220 on swampy terrain, on sand or in water, for example. Other terrains for optimization may comprise, bumpy terrain, and a slope, for example. Also the load being transferred may set requirements for optimization. Such load may comprise, for example patient(s), liquids, fragile equipment, hazardous materials or a sensing device measuring and/or collecting data.

In an embodiment, the vehicle 200, 1220 may be unmanned or manned. The vehicle 200, 1220 may also comprise elements for loading and/or unloading transferred load to/from the vehicle.

Figure 6:
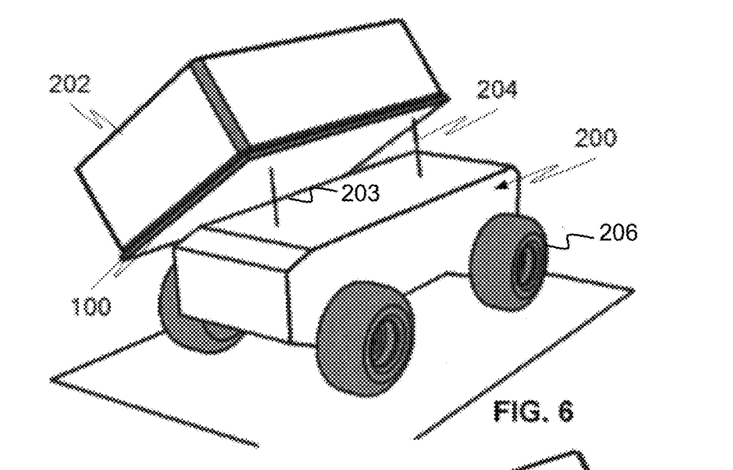
FIGS. 6-8 illustrate exemplary actuating means for optimizing and/or balancing the transportation vehicle according to an embodiment of the invention.
Figures 7, 8:
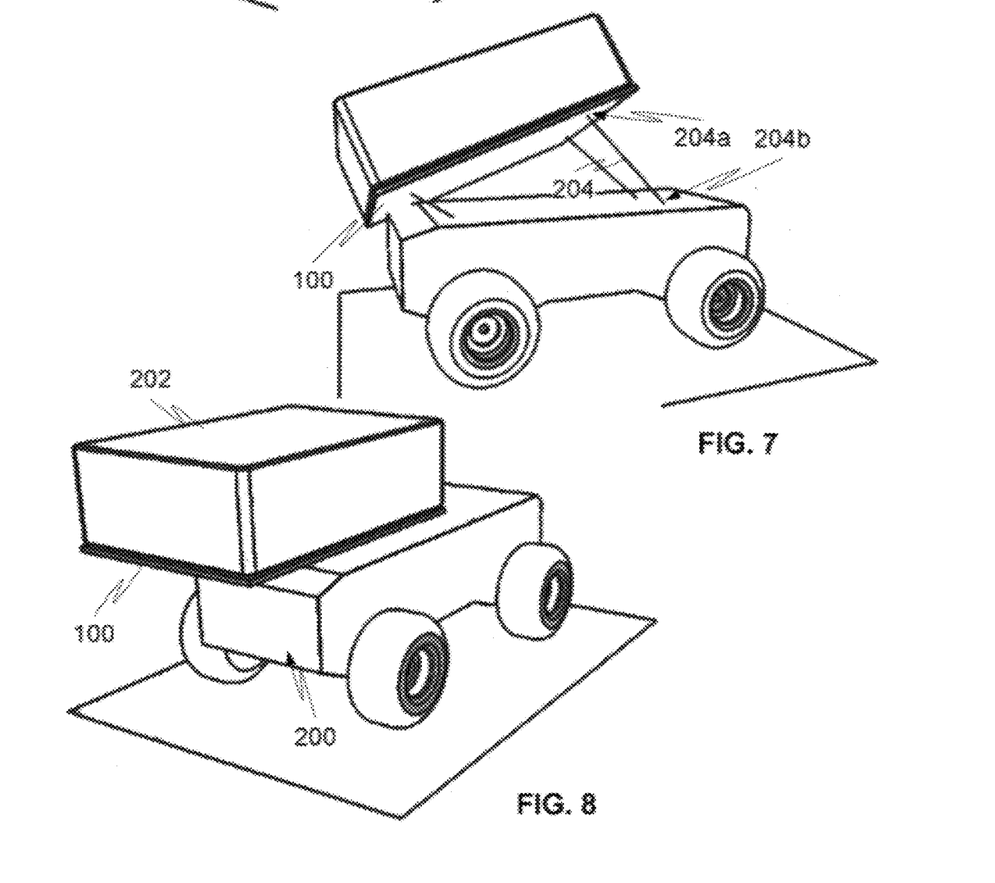

FIGS. 6-8 illustrate exemplary actuating means for optimizing and/or balancing the transportation vehicle according to an embodiment of the invention.

The optimizing system may for example, by an actuation device, move the platform 202 essentially in an X-Y-plane, or moving it in Z-direction (XYZ representing normal rectangular coordinate system, Cartesian coordinates) at least in one point, or (3D) tilting or banking the platform 202 in relation to at least one axis of X, Y or Z axes, as can be additionally seen also in FIGS. 6, 7 and 8. The platform 202 may be for example hinged 203 at a certain point around which the tilting is configured to be happened. The optimizing system may also comprise actuating device 204, such as one, two or more cylinders or the like, which are configured to cause said tilting function (e.g. FIG. 6, 7). In addition the balancing system may rotate the platform 202 around a point 205 locating for example in the XYZ-coordinates, especially in XY-plane.

In an embodiment, a first end of the actuating device 204 is configured to be coupled with the platform 202 and another end is configured to be coupled with the vehicle 200 either directly or via an accessory device, and further wherein length, angle or position of the actuating device 204 is configured to be adjusted based on the controlling commands.

In an embodiment, the transportation vehicle 200, further comprises at least one moving device 206 for moving the vehicle 200, each of the moving devices being coupled with the vehicle 200 via a mounting, where the mounting is configured to adjust height or distance of the moving devices 206 in relation to the vehicle 200. Furthermore, also angular position of the mounting device may be sensed using an inclinometer or such to provide a sensing signal corresponding to an angle of an arm of a vehicle tyre, for example. The moving device 206 may comprise, for example, a tyre or a wheel of the vehicle 200.

In an embodiment, in case of pneumatic tire failure, a vehicle centre of gravity is adjusted that enables distribution of load in such way that the load on damaged tire is minimized. Tire failure may be sensed using tyre air pressure sensor or rotating speed information generated by the sensing device as a vehicle sensing-signal.

In an embodiment, tire failure may be sensed using tyre air pressure sensor or rotating speed information generated by the sensing device as a vehicle sensing-signal. This makes it possible to drive the vehicle further despite the tire failure, for example to a more convenient location for a tire change.

The actuating device 204 may be, for example, a hydraulically or pneumatically operated cylinder, an electric motor, a magnetic motor, a threaded rod, a push bar, and a chain or the like in order to move the platform 202.

In an embodiment, the first end 204a of the actuating device is advantageously coupled with the platform 202 and another end 204b is coupled with the vehicle 200 either directly or via an accessory means, such as a frame of the optimizing arrangement 100.

The arrangement 100 further comprises a sensing device 102 configured to generate a vehicle sensing signal and/or a non-vehicle sensing signal;

and a controlling device 101 configured to receive at least one of the vehicle sensing signal and the non-vehicle sensing signal; generate controlling commands based on the received at least one of the vehicle sensing signal and the non-vehicle sensing signal; and transmit the controlling commands to the actuating device 204; wherein the actuating device is configured to receive the controlling commands and to move the platform 202 in relation to the transportation vehicle 200 based on the controlling commands, as can be seen in FIGS. 5A-5D and 9, for example.

The controlling device 101 may comprise or being in a data communication connection 103 with a sensing device 102, for sensing or deriving vehicle or non-vehicle sensing information, for example the location of the centre of gravity of the arrangement 100 with the platform 202 and/or the vehicle 200. In addition the controlling device 101 may comprise or being in a data communication connection with a command means for providing the actual controlling commands for the actuating device 204 for moving the platform 202 in relation to the vehicle 200 so that the centre of gravity is kept within a certain, advantageously predefined and optimized area, for example. The sensing device 102 may be located within the vehicle 200 or external to the vehicle 200 but in both cases being in a data communication connections with the controlling device 101.

Figure 9:
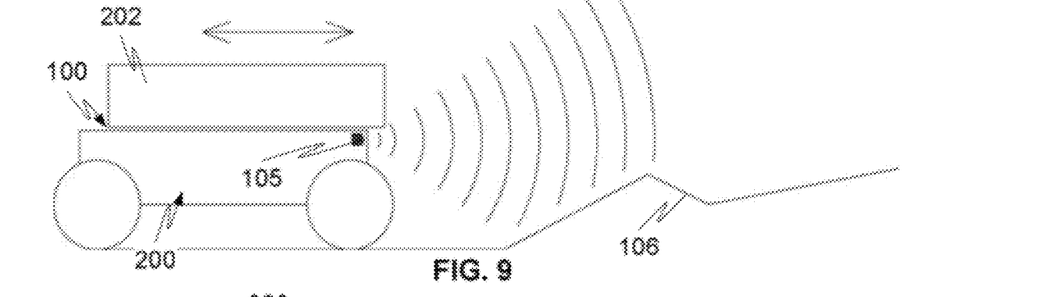
FIG. 9 illustrates an exemplary controlling arrangement with sensing devices for optimizing and/or balancing the transportation vehicle according to an embodiment of the invention.

FIG. 9 illustrates an exemplary controlling arrangement with sensing devices for optimizing and/or balancing the transportation vehicle according to an embodiment of the invention.

In an embodiment, the arrangement may also comprise sensing device 105 for sensing non-vehicle related information that may affect the vehicle 200 movement, position or the location of the centre of gravity of the system in near future in its track or course, such as a geomagnetic field sensor; a transceiver for receiving weather information and/or topography information; a camera; an IR-scanner; an ultrasound scanner; a light detection and ranging (Lidar) device; and a radar or the like, for example, for determining the topography of the routing, as is described in FIG. 9, and thereby providing the controlling commands how to move the platform 202 in relation to the vehicle 200 in an appropriate manner so that the centre of gravity will be kept within a certain, advantageously predefined area, when the vehicle arrives and passes the determined route 106.

In an embodiment, the arrangement 100 may be configured to manipulate the actuating device 204 (via the control commands) to initiate the moving of the platform 202 already before the actual geographical point 106 based on the predictive information of the becoming geometry changes on the path, such as based on the data received by the sensing device 105 or other devices suitable for generating this kind of data, like database of a topography map with position data received e.g. from GPS or other positioning device.

Figure 10:
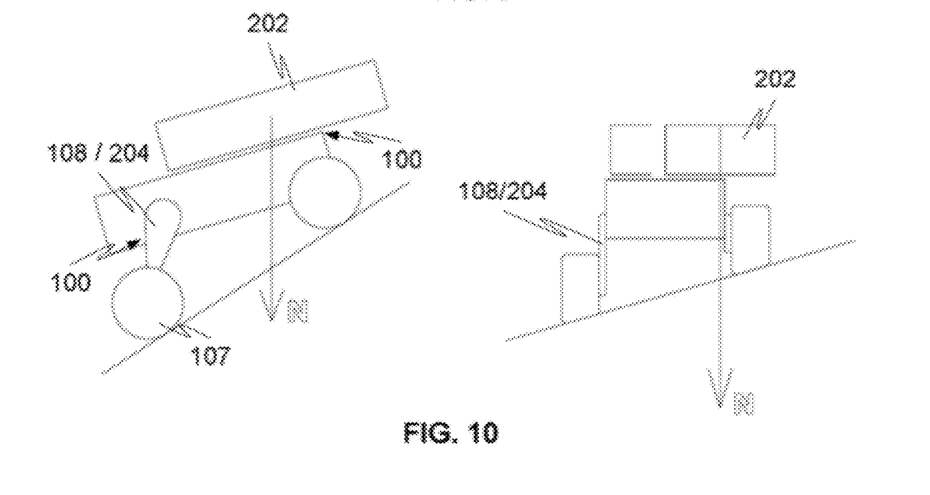
FIG. 10 illustrates another exemplary of an arrangement for optimizing and/or balancing the transportation vehicle according to an embodiment of the invention.

FIG. 10 illustrates another exemplary of an arrangement for optimizing and/or balancing the transportation vehicle according to an embodiment of the invention.

The vehicle 200 or the arrangement 100 may also comprise at least one moving device 107 for moving the vehicle 200, such as a wheel or crawler track, as is described in FIG. 10. The moving device may be coupled with the vehicle 200 or the arrangement 100 via a mounting device 108, such as e.g. an arm or cylinder or axis so that the mounting means can manipulate height or distance of the moving means in relation to the vehicle and thereby forming the arrangement and moving or tilting the vehicle or platform. Thus the mounting device 108, as manipulated and operated like described here, can be construed to be as the arrangement 100.

Figure 11:
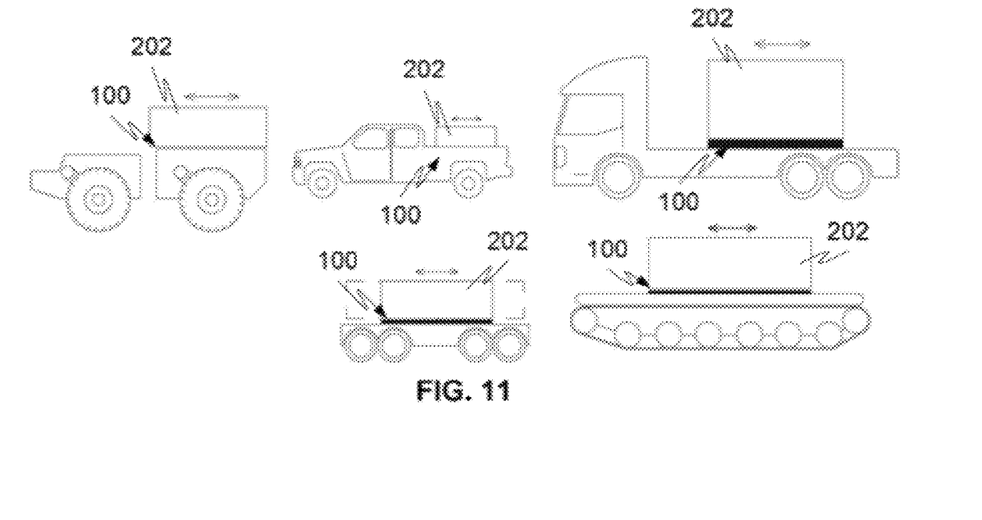
FIG. 11 illustrates examples of the transportation vehicles provided with the optimizing and/or balancing arrangement according to an embodiment of the invention.

FIG. 11 illustrates examples of the transportation vehicles provided with the optimizing and/or balancing arrangement according to an embodiment of the invention. The transportation vehicle 200 may comprise, such as an off-road, off-shore or otherwise unstable vehicle and it may be for example a car, all-terrain vehicle, caterpillar kind of vehicle, crawler, trailer, train, ship, or hovercraft. The vehicle may comprise wheels or one or more crawler tracks. The platform 202 may be a truck platform, freight container, tank, receptacle, trough, chassis or any other device or base suitable for receiving a load, or even portion of said load, such as a base of a tool, the tool being as said load. The load may be for example solid, fluid or gas load, a box, sand, rock, a tool, like a gun, water gun, lifter or any accessories as an example.

The invention has been explained above with reference to the aforementioned embodiments, and several advantages of the invention have been demonstrated. It is clear that the invention is not only restricted to these embodiments, but comprises all possible embodiments within the spirit and scope of the inventive thought and the following patent claims. For example plurality of the transportation vehicles described in this document can be coupled to move in a synchronized manner with each other so that for example relative velocity and movements of the platforms of at least two of the vehicles are actuated, so moved, essentially simultaneously.

In addition it is to be noted that the vehicles of the invention can be provided with loading and unloading equipment for loading e.g. a demountable container as well as unloading it. Furthermore it is to be noted that according to an example the one vehicle may be as a main vehicle (e.g. without the load) for tracking and sensing a route and e.g. obstacles and inclinations or the like on the route and providing controlling information and/or controlling commands to at least one another vehicle transporting the load, whereupon the overall speed can be increased, because the arrangement of the vehicle carrying the load knows beforehand how to control the actuating device for moving the platform in relation to a vehicle and so to control a centre of gravity of the system or vehicle to locate within a certain area in relation to the system or vehicle by moving the platform in relation to said vehicle.

Figure 12:
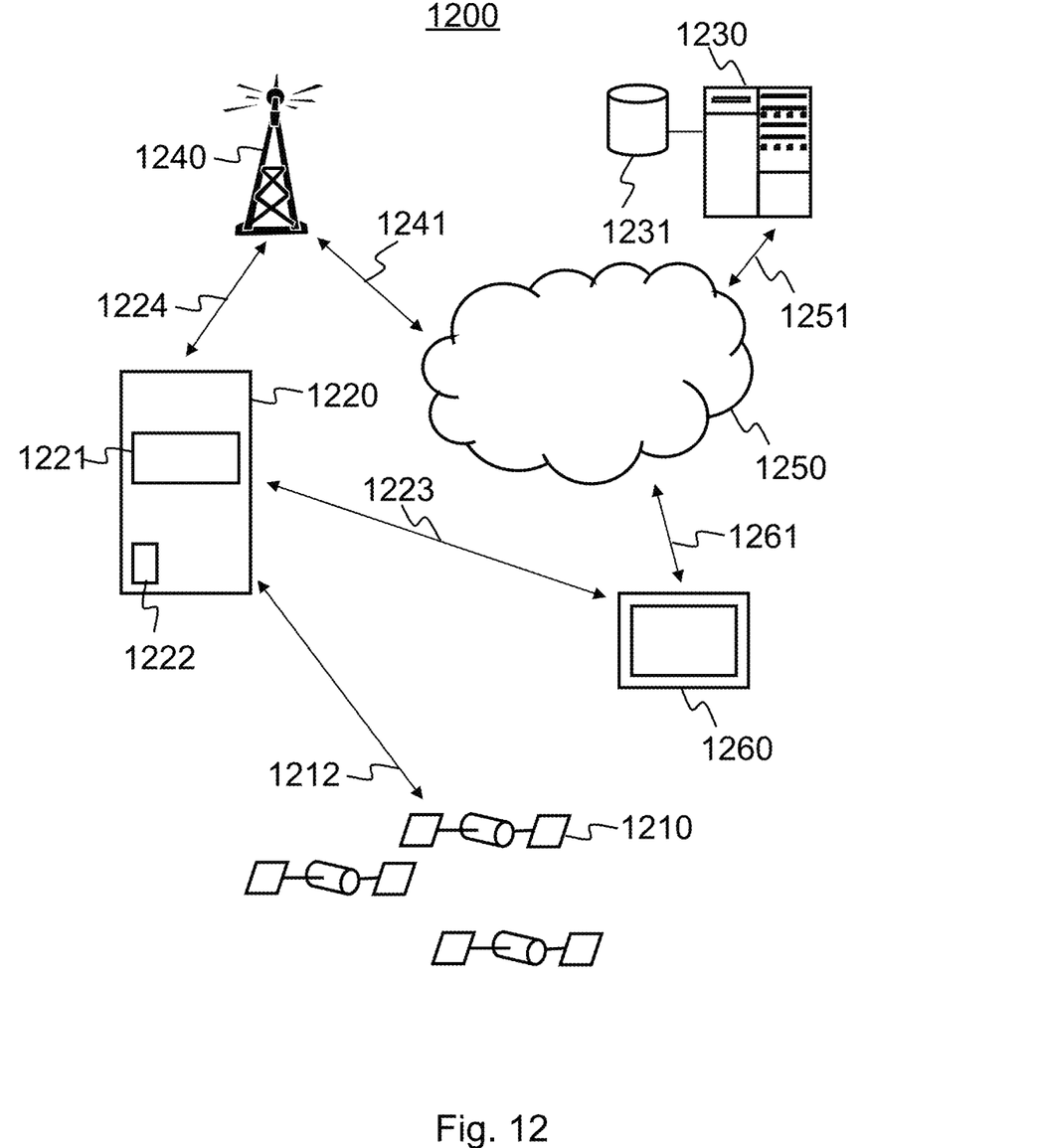
FIG. 12 shows a schematic picture of a system according to an example embodiment of the invention.

FIG. 12 shows a schematic picture of a system 1200 according to an example embodiment of the invention. The system 1200 comprises a plurality of satellites 1210 in orbit about the Earth. The orbit of each satellite 1210 is not necessarily synchronous with the orbits of other satellites and, in fact, is likely asynchronous. A global positioning system receiver apparatus such as the ones described in connection with preferred embodiments of the present invention is shown receiving spread spectrum global positioning system (GNSS) satellite signals 1212 from the various satellites 1210.

A vehicle 1220 may comprise controlling device 1221 that may be an integrated controlling device, or for example, a mobile phone, an Internet tablet, a mobile terminal or a laptop computer, for example. The controlling device 1221 is capable of downloading and locally executing software program code. The software program code may be a client application of a service whose server application is running on the server apparatus 1230 of the system 1200. The controlling device 1221 may comprise a sensing device 1222, such as an environmental and current activity data capturing element, such as an accelerometer, a compass, a wind sensor, a barometer, a GPS receiver and a flute height sensor, for example. The controlling device 1221 is configured to be connectable to a wireless communication network 1240 over a wireless connection 1224. The wireless connection 1224 may comprise a mobile cellular network or a wireless local area network (WLAN), for example. The wireless communication network may be to a public data communication network 1250, for example the Internet, over a data connection 1241.

In an embodiment, the controlling device 1221 may be comprised in any part of the vehicle 1220, such as the platform, the sensing device 1222 or the framework of the vehicle 1220.

In an embodiment, the controlling device 1221 may also be located external to the vehicle 1220, for example in a user device 1260, in another vehicle or in the server 1230, 1231 connectable to the vehicle 1220 over network connection 1224,1223, 1212, for example.

In an embodiment, a platform is arranged to the transportation vehicle 1220 for receiving a load; an actuating device is arranged for moving the platform in relation to the transportation vehicle 1220; a sensing device is configured to generate a vehicle sensing signal and/or a non-vehicle sensing signal; and a controlling device 1221 is configured to: receive at least one of the vehicle sensing signal and the non-vehicle sensing signal; and to generate controlling commands based on the received at least one of the vehicle sensing signal and the non-vehicle sensing signal; and transmit the controlling commands to the actuating device, wherein the actuating device is configured to receive the controlling commands and to move the platform in relation to the transportation vehicle based on the controlling commands.

In an embodiment, external control information may be received by a controlling device 1221, and controlling commands are generated based on the external control information, the vehicle sensing signal and the non-vehicle sensing signal by a controlling device 1221.

In an embodiment, the external control information is received from at least one of the following: another transportation vehicle; a user device 1260; and a cloud server 1230, 1231.

In an embodiment, controlling commands may be generated based on at least one sensing signal that may comprise a control signal based on speech recognition of a user voice commands nearby the vehicle or remotely from a user device.

The controlling device 1221 may learn from history data of the vehicle movements and controlling commands and such history data may be used as an input for generating controlling commands as well together with sensing signals generated by the sensing device. Controlling commands may also be associated to certain functional mode. Controlling commands may also be delayed before transmitting to the actuating device, either for operational reasons or security reasons, for example.

In an embodiment, controlling commands can be encrypted to improve security of the arrangement. Furthermore, history data, such as previous controlling commands and sensing device information may be stored within the vehicle, for example within the controlling device 1221.

In an embodiment, all history data may be permanently erased in response to a triggering signal, such as a signal indicating that the vehicle is damaged or destroyed and cannot be fully operated anymore. Erasing all data may be useful especially in security or military applications that requires strict privacy.

In an embodiment, the controlling commands are configured to control moving the platform in relation to the vehicle 1220 so that the centre of gravity is kept within a certain area or to balance or manage weight distribution between different portions of the vehicle 1220.

In an embodiment, the controlling commands are configured to control moving the platform towards a rear portion of the vehicle in response to detecting deceleration of the vehicle based on the vehicle sensing signal.

In an embodiment, the controlling commands are configured to control moving the platform towards a front portion of the vehicle in response to detecting acceleration of the vehicle based on the vehicle sensing signal.

In an embodiment, the controlling commands are configured to control moving the platform towards a left portion of the vehicle in response to detecting turning left of the vehicle based on the vehicle sensing signal.

In an embodiment, the controlling commands are configured to control moving the platform towards a right portion of the vehicle in response to detecting turning right of the vehicle based on the vehicle sensing signal.

In an embodiment, the system 1200 comprises a computer apparatus 1260 configured to be connectable to the controlling device 1221 over a data connection 1223. The data connection 1223 may comprise a wired connection or a wireless connection. The wired connection may comprise Universal Serial Bus (USB), High-Definition Multimedia Interface (HDMI) or local area network (LAN), for example. The wireless connection may comprise Bluetooth™, Radio Frequency Identification (RF-ID) or wireless local area network (WLAN), for example. The computer apparatus 1260 may be connected to a public data communication network 1250, for example the Internet, over a data connection 1261.

In an embodiment, the system 1200 comprises a server apparatus 1230, which comprises a storage device 1231 for storing vehicle 1220 related data, such as control data, command data, external control information, history data, weather information, map information, topography data and profile data, for example, over data connection 1251.

In an embodiment, external control information may travel to a controlling device 1221 over different paths. A first path may comprise sending reference external control information generated by another user over a wireless communication network 1224, 1240, 1241 and public data communication network 1250, 1251 from the server apparatus 1230. A second path may comprise sending external control information to the computer apparatus 1260 and therefrom over the data connection 1223 to the controlling device 1221. A third path may comprise receiving external control information by the controlling device 1221 from another vehicle, or from a user of the vehicle 1220, either locally or remotely.

In an embodiment, a proprietary application in controlling device 1221 may be a client application of a service whose server application is running on the server apparatus 1230 of the system 1200. The proprietary application may capture the activity data of the vehicle 1220 to be stored at the server 1230, 1231. Also vehicle sensing signal and non-vehicle sensing signal related information may be retrieved by the proprietary application from the sensing device of the arrangement or the vehicle 1220.

In an embodiment, the proprietary application may capture current sensing signals to be processed at the controlling device 1221. Also current environmental data for the captured sensing signal information may be retrieved by the proprietary application from the capturing elements.

Figure 13:
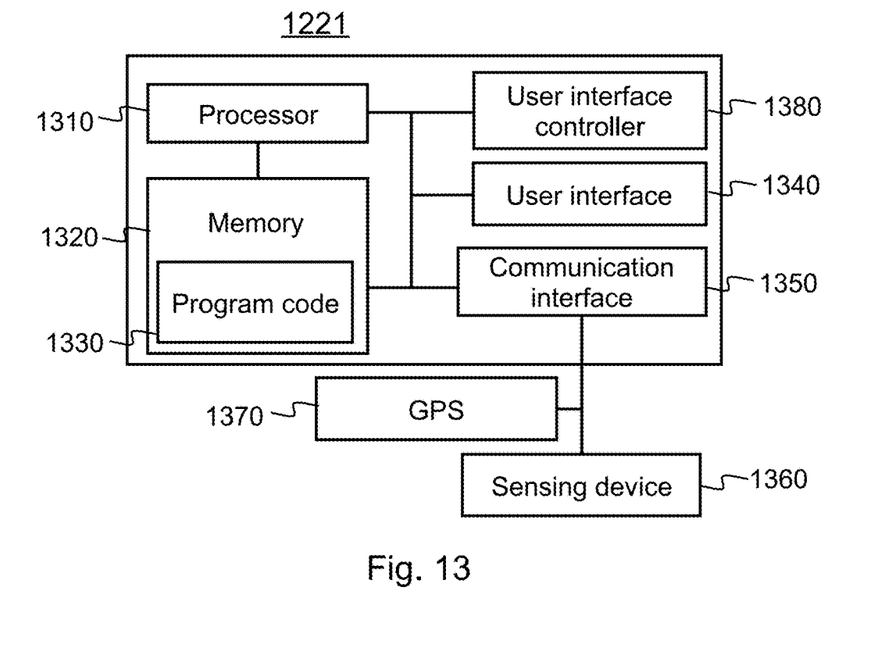
FIG. 13 presents an example block diagram of a controlling device in which various embodiments of the invention may be applied.

FIG. 13 presents an example block diagram of a controlling device 1221 in which various embodiments of the invention may be applied. The controlling device 1221 may be a user equipment (UE), user device or apparatus, such as a mobile terminal, a smart phone or other communication device.

The general structure of the controlling device 1221 comprises a user interface 1340, a communication interface 1350, a satellite positioning device (GPS) 1370, a sensing device 1360 for capturing current activity data and current environmental data, a processor 1310, and a memory 1320 coupled to the processor 1310. The controlling device 1221 further comprises software 1330 stored in the memory 1320 and operable to be loaded into and executed in the processor 1310. The software 1330 may comprise one or more software modules and can be in the form of a computer program product. The controlling device 1221 may further comprise a user interface controller 1380.

The processor 1310 may be, e.g., a central processing unit (CPU), a microprocessor, a digital signal processor (DSP), a graphics processing unit, or the like. FIG. 13 shows one processor 1310, but the controlling device 1221 may comprise a plurality of processors.

The memory 1320 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The controlling device 1221 may comprise a plurality of memories. The memory 1320 may be constructed as a part of the controlling device 1221 or it may be inserted into a slot, port, or the like of the controlling device 1221 by a user. The memory 1320 may serve the sole purpose of storing data, or it may be constructed as a part of an apparatus serving other purposes, such as processing data. A proprietary activity application, activity data and environmental data may be stored to the memory 1320.

The user interface controller 1380 may comprise circuitry for receiving input from a user of the controlling device 1221, e.g., via a keyboard, graphical user interface shown on the display of the user interfaces 1340 of the controlling device 1221, speech recognition circuitry, or an accessory device, such as a headset, and for providing output to the user via, e.g., a graphical user interface or a loudspeaker.

The satellite positioning device 1370 is configured to provide location information. Such information may comprise, for example, position coordinates, speed, direction of movement; and slope information.

The communication interface module 1350 implements at least part of data transmission. The communication interface module 1350 may comprise, e.g., a wireless or a wired interface module. The wireless interface may comprise such as a WLAN, BLUETOOTH™, infrared (IR), radio frequency identification (RF ID), GSM/GPRS, CDMA, WCDMA, or LTE (Long Term Evolution) radio module. The wired interface may comprise such as universal serial bus (USB) or National Marine Electronics Association (NMEA) 0183/2000 standard for example. The communication interface module 1350 may be integrated into the controlling device 1221, or into an adapter, card or the like that may be inserted into a suitable slot or port of the controlling device 1221. The communication interface module 1350 may support one radio interface technology or a plurality of technologies. The controlling device 1221 may comprise a plurality of communication interface modules 1350.

A skilled person appreciates that in addition to the elements shown in FIG. 13, the controlling device 1221 may comprise other elements, such as microphones, extra displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the controlling device 1221 may comprise a disposable or rechargeable battery (not shown) for powering when external power if external power supply is not available.

In an embodiment, the controlling device 1221 comprises speech recognition means. Using these means, a pre-defined phrase may be recognized from the speech and translated into control information for the controlling device 1221, for example.

The satellite positioning device 1370 and the sensing device 1360 may be configured to be comprised by the controlling device 1221 or connected as separate devices to the controlling device 1221. In case the satellite positioning device 1370 and the sensing device 1360 are comprised in the controlling device 1221 they may be connected to the controlling device 1221 using an internal bus of the controlling device 1221. In case the satellite positioning device 1370 and the sensing device 1360 are external devices connected to the controlling device 1221 they may be connected to the controlling device 1221 using communication interface 1350 of the controlling device 1221 or using the internal bus.

In an embodiment, not all elements of the controlling device 1221 are necessary, such as user interface controller 1380, user interface 1340, or positioning device 1370, for example.

Figure 14:
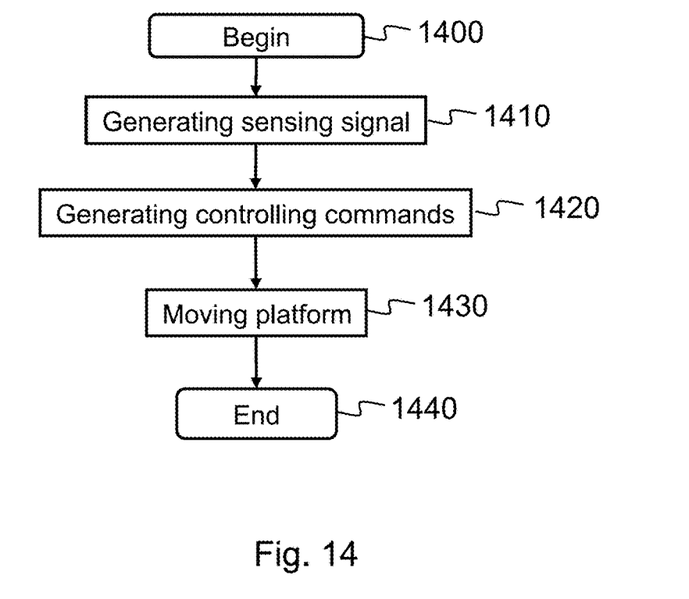
FIG. 14 shows a flow diagram showing operations in accordance with an example embodiment of the invention.

FIG. 14 shows a flow diagram showing operations in accordance with an example embodiment of the invention. In step 1400, the method for optimizing load position in relation to a transportation vehicle, wherein the transportation vehicle comprises a platform for receiving a load, and an actuating device for moving the platform in relation to the transportation vehicle, is started. In step 1410, a vehicle sensing signal and/or a non-vehicle sensing signal are generated by a sensing device. In step 1420, controlling commands are generated based on at least one of the vehicle sensing signal and the non-vehicle sensing signal by a controlling device. In step 1430, the platform is moved in relation to the transportation vehicle based on the controlling commands by the actuating device. The method is ended in step 1440.

Figure 15:
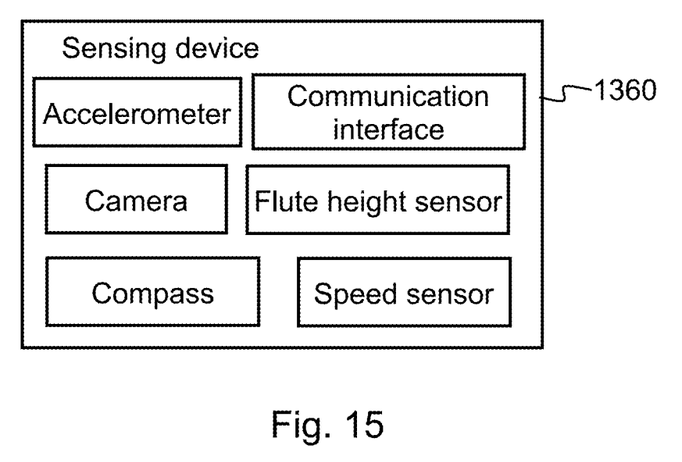
FIG. 15 presents an example block diagram of a sensing device in which various embodiments of the invention may be applied.

FIG. 15 presents an example block diagram of a sensing device 1360 in which various embodiments of the invention may be applied. The sensing device 1360 may comprise various means for activity data detection and environmental data detection, for example. The sensing device 1360 may be used for both vehicle and non-vehicle related data capturing.

In an embodiment, the sensing device 1360 may comprise at least one of the following devices:
- an accelerometer;
- an inclinometer;
- an angular velocity sensor;
- a geomagnetic field sensor;
- a vehicle tyre pressure sensor;
- a pressure or weight sensing sensor;
- a transceiver for receiving weather information and/or topography information;
- a camera;
- an IR-scanner;
- an ultrasound scanner;
- a light detection and ranging (Lidar) device;
- a radar;
- a global navigation satellite system (GNSS) device;
- an anemometer for providing wind information;
- a wind sensor for providing wind information;
- a sensor for providing flute height information;
- a barometer for measuring air pressure;
- a temperature sensor for measuring environmental temperature;
- a water depth sensor for measuring depth information;
- a chart plotter for providing position information;
- a sail sensor for providing sail information;
- a speed sensor for providing speed information;
- a video camera for providing a video signal; and
- a compass for providing direction information.

In an embodiment, a vehicle sensing signal generated by the sensing device 1360 may comprise at least one of the following: rotating speed information of at least one wheel of the transportation vehicle; inclination information of at least one wheel of the transportation vehicle or the transportation vehicle, and a centre of gravity of the transportation vehicle and the platform.

In an embodiment, the sensing device 1360 may comprise pressure or weight sensing device for determining pressure or weight difference or distribution between at least on two points of the arrangement or the vehicle, whereupon the sensing device 1360 is configured to determine location of the centre of gravity of the arrangement or the vehicle based on the pressure or weight difference, or the distribution.

The sensing device 1360 may also comprise several sensing devices 1360, combinations of any above mentioned devices, and the like. The environmental temperature may comprise air temperature, water temperature or ground surface temperature, for example.

In an embodiment, the sensing device 1360 may generate non-vehicle sensing signal that comprises at least one of the following:
  terrain information relating to current position of the vehicle;
  terrain information relating to a path in a heading of the vehicle;
  terrain information around the vehicle;
  control information generated in response to driver input;
  location information of an object;
  weather information; and
  topographic information.
  In an embodiment, the terrain information comprises geometry of the path in the heading of the vehicle.

In an embodiment, a wind sensor 1360 is configured to determine or measure wind angle and wind speed. The wind sensor 1360 may comprise any element of combination of elements operable to sense wind-related information for use by the controlling device 1221. For example, the wind sensor 1360 may be operable to sense apparent wind speed, apparent wind angle, true wind speed, true wind angle, wind velocity made good (VMG), combinations thereof, and the like.

In an embodiment, a video camera 1360 is configured to provide video signal. Based on the video signal the controlling device 1221 may determine at least part of the environmental data or non-vehicle data. For example terrain information or flute height may be determined based on the video signal from the video camera 1360. The determination may be done by video image processing, pattern recognition, measuring a rocking movement or relative movement of a horizon, for example.

The capturing device 1360 may comprise communication interface module implementing at least part of data transmission. The communication interface module may comprise, e.g., a wireless or a wired interface module. The wireless interface may comprise such as a WLAN, BLUETOOTH™, infrared (IR), radio frequency identification (RF ID), GSM/GPRS, CDMA, WCDMA, or LTE (Long Term Evolution) radio module. The wired interface may comprise such as universal serial bus (USB) or National Marine Electronics Association (NMEA) 0183/2000 standard for example. The communication interface module may be integrated into the sensing device 1360, or into an adapter, card or the like that may be inserted into a suitable slot or port of the sensing device 1360. The communication interface module may support one radio interface technology or a plurality of technologies. The sensing device 1360 may comprise a plurality of communication interface modules.

Without in any way limiting the scope, interpretation, or application of the claims appearing below, a technical effect of one or more of the example embodiments disclosed herein is an improved solution for optimizing load position in relation to a transportation vehicle. Another technical effect of one or more of the example embodiments disclosed herein is the provision of an arrangement to improve speed or smoothness of the moving vehicle. Another technical effect of one or more of the example embodiments disclosed herein is the provision of an arrangement to control moving the platform in relation to the vehicle so that the center of gravity is kept within a certain area or to balance or manage weight distribution between different portions of the vehicle in order to optimize speed or movement of the vehicle, for example.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications, which may be made without departing from the scope of the present invention as defined in the appended claims.

The invention claimed is:

1. An arrangement for optimizing load position in relation to a transportation vehicle, comprising:
  a platform arranged on the transportation vehicle for receiving a load;
  an actuating device for moving the platform in relation to the transportation vehicle;
  a sensing device configured to generate a vehicle sensing signal and/or a non-vehicle sensing signal;
  a controlling device configured to:
    receive at least one of the vehicle sensing signal and the non-vehicle sensing signal;
    generate controlling commands based on the received at least one of the vehicle sensing signal and the non-vehicle sensing signal; and
    transmit the controlling commands to the actuating device;
  wherein the actuating device is configured to receive the controlling commands and to laterally move the platform in an XY-plane in relation to the transportation vehicle based on the controlling commands.

2. The arrangement of claim 1, wherein the vehicle sensing signal comprises at least one of the following:
  rotating speed information of at least one wheel of the transportation vehicle;
  angular information of at least one arm for mounting a wheel of the transportation vehicle;
  tyre pressure information of at least one wheel of the transportation vehicle;
  inclination information of at least one wheel of the transportation vehicle or the transportation vehicle; and
  location of a center of gravity of the transportation vehicle and the platform.

3. The arrangement of claim 2, wherein the controlling commands are configured to control moving the platform in relation to the vehicle so that the center of gravity is kept within a certain area or to balance or manage weight distribution between different portions of the vehicle.

4. The arrangement of claim 1, wherein the controlling commands are configured to control moving the platform towards a rear portion of the vehicle in response to detecting deceleration of the vehicle based on the vehicle sensing signal.

5. The arrangement of claim 1, wherein the controlling commands are configured to control moving the platform towards a front portion of the vehicle in response to detecting acceleration of the vehicle based on the vehicle sensing signal.

6. The arrangement of claim 1, wherein the sensing device comprising pressure or weight sensing device for determining pressure or weight difference or distribution between at least on two points of the arrangement or the vehicle, whereupon the sensing device is configured to determine location of the center of gravity of the arrangement or the vehicle based on the pressure or weight difference, or the distribution.

7. The arrangement of claim 1, wherein the sensing device for generating the vehicle sensing signal comprising at least one of the following:
an accelerometer;
an inclinometer;
a vehicle tyre pressure sensor;
a pressure or weight sensing sensor;
an angular velocity sensor; and
a global navigation satellite system (GNSS) device.

8. The arrangement of claim 1, wherein the sensing device for generating the non-vehicle sensing signal comprising at least one of the following:
a geomagnetic field sensor;
a transceiver for receiving weather information and/or topography information;
a camera;
an IR-scanner;
an ultrasound scanner;
a user input device to receive and generate control information generated in response to driver input;
a light detection and ranging (Lidar) device; and
a radar.

9. The arrangement of claim 1, wherein the non-vehicle sensing signal comprises at least one of the following:
terrain information relating to current position of the vehicle;
terrain information relating to a path in a heading of the vehicle;
terrain information around the vehicle;
control information generated in response to driver input;
location information of an object;
weather information; and
topographic information.

10. The arrangement of claim 9, wherein the terrain information comprising geometry of the path in the heading of the vehicle, and the actuating device is configured to initiate the moving of the platform based on geometry changes on the path.

11. The arrangement of claim 1, wherein the actuating device is further configured to perform at least one of the following:
tilt or bank the platform in relation to at least one of the X, Y and Z axes; and
rotate the platform around a point locating in the XY-plane.

12. The arrangement of claim 1, wherein the actuating device comprising at least one of the following: a hydraulically or pneumatically operated cylinder, an electric motor, a magnetic motor, a threaded rod, a push bar, and a chain.

13. The arrangement of claim 1, wherein a first end of the actuating device is configured to be operationally coupled with the platform and another end is configured to be operationally coupled with the vehicle, either directly or via an accessory device, and further wherein length, angle or position of the actuating device is configured to be adjusted based on the controlling commands.

14. A transportation vehicle, comprising an arrangement for optimizing load position in relation to a transportation vehicle, comprising:
a platform arranged on the transportation vehicle for receiving a load;
an actuating device for moving the platform in relation to the transportation vehicle;
a sensing device configured to generate a vehicle sensing signal and/or a non-vehicle sensing signal;
a controlling device configured to:
receive at least one of the vehicle sensing signal and the non-vehicle sensing signal;
generate controlling commands based on the received at least one of the vehicle sensing signal and the non-vehicle sensing signal; and
transmit the controlling commands to the actuating device;
wherein the actuating device is configured to receive the controlling commands and to laterally move the platform in an XY-plane in relation to the transportation vehicle based on the controlling commands.

15. The transportation vehicle of claim 14, further comprising at least one moving device for moving the vehicle, each of the moving devices being coupled with the vehicle via a mounting, where the mounting is configured to adjust height or distance of the moving devices in relation to the vehicle.

16. A method for optimizing load position in relation to a transportation vehicle, wherein the transportation vehicle comprises a body and a platform for receiving a load, the platform disposed on a surface of the body, and an actuating device for moving the platform in relation to the surface of the body of the transportation vehicle, the method comprising:
generating a vehicle sensing signal and/or a non-vehicle sensing signal by a sensing device;
generating controlling commands based on at least one of the vehicle sensing signal and the non-vehicle sensing signal by a controlling device; and
laterally moving the platform in an XY-plane in relation to the transportation vehicle based on the controlling commands by the actuating device.

17. The method of claim 16, further comprising:
receiving external control information by the controlling device; and
generating controlling commands using the external control information.

18. The method of claim 17, further comprising:
generating controlling commands based on the external control information, and the at least one of the vehicle sensing signal and the non-vehicle sensing signal by the controlling device.

19. The method of claim 17, wherein the external control information is received from at least one of the following:
another transportation vehicle;
a user device; and
a cloud server.

20. A computer program embodied on a computer readable non-transitory medium comprising computer executable program code, which code, when executed by at least one processor of an apparatus, causes the apparatus to:
generate a vehicle sensing signal and/or a non-vehicle sensing signal by a sensing device;

generate controlling commands based on at least one of the vehicle sensing signal and the non-vehicle sensing signal by a controlling device; and move a platform in relation to a transportation vehicle based on the controlling commands by an actuating device, for optimizing load position in relation to the transportation vehicle, wherein the transportation vehicle comprises, on the transportation vehicle, the platform for receiving a load, and the actuating device for laterally moving the platform in an XY-plane in relation to the transportation vehicle.

* * * * *